Willard and Ross,
Mower.
No 1,777 Reissued, Sep. 27. 1864
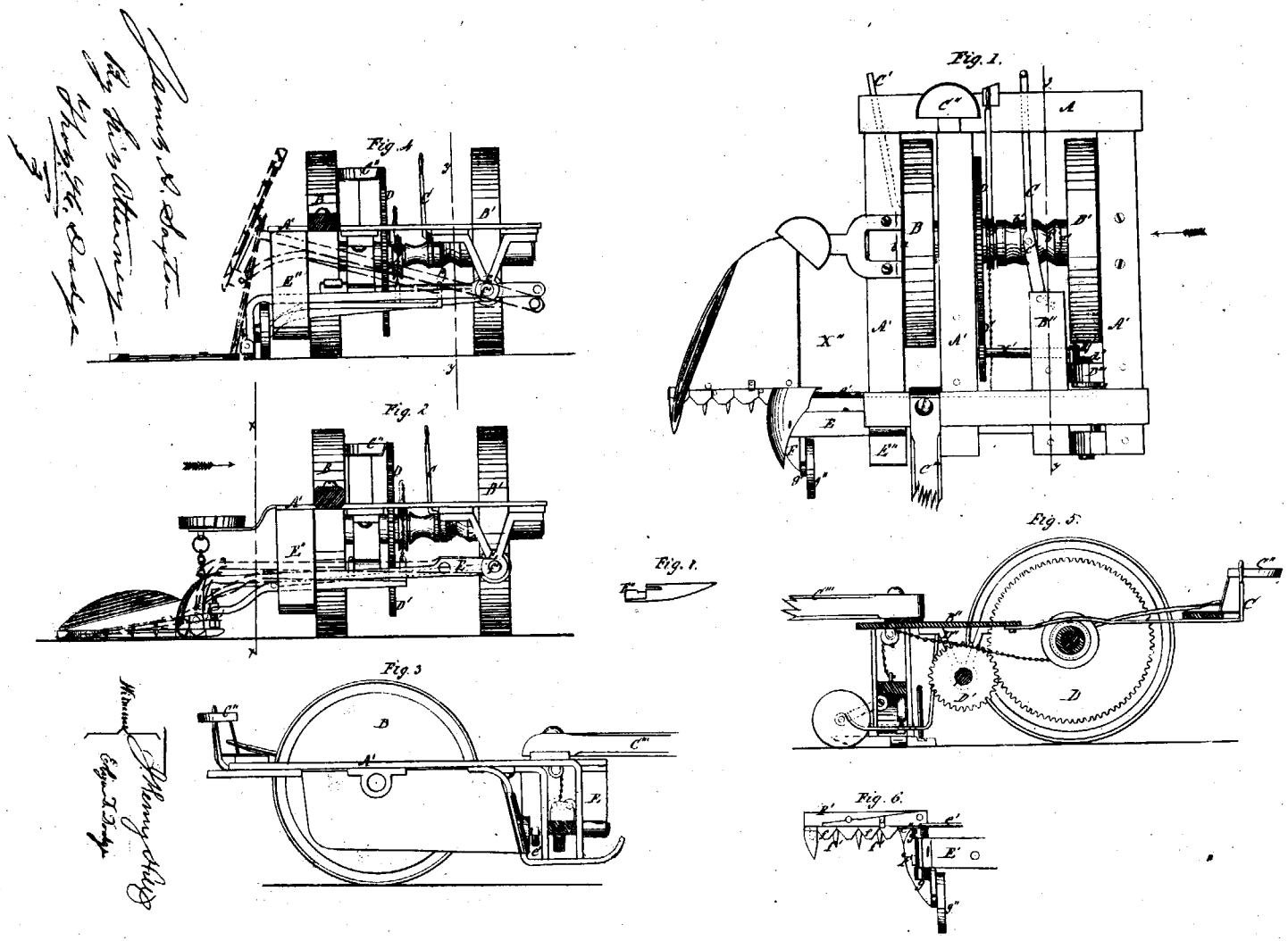
James A. Sayton
By his Attorney
Thos. G. Dodge
Witnesses
J. Henry Hill
Elijah T. Dodge

UNITED STATES PATENT OFFICE.

JAMES A. SAXTON, OF CANTON, OHIO, ASSIGNEE, BY MESNE ASSIGNMENTS, OF HOSEA WILLARD AND ROBT. ROSS.

IMPROVEMENT IN HARVESTERS.

Specification forming part of Letters Patent No. 18,562, dated November 3, 1857; Reissue No. 1,777, dated September 27, 1864.

*To all whom it may concern:*

Be it known that HOSEA WILLARD, of Vergennes, in the county of Addison and State of Vermont, and ROBERT ROSS, formerly of same place, but now residing at St. Albans, in the county of Franklin, in said State, invented certain new and useful Improvements in Grain and Grass Harvesting Machines, of which the following is a full, clear, and exact description, reference being had to the accompanying drawings, making part of this specification, and in which—

Figure 1 is a plan or top view, showing one mode of applying said improvements when the machine is to be used as a reaper. Fig. 2 represents a front view of Fig. 1 with the leading-wheel removed to show the parts in rear of it more fully, the coupling-arm, finger-beam, and platform being shown in different positions to illustrate the flexible connection of the finger-beam with the machine. Fig. 3 represents a section and side view on line *x x*, Fig. 2, when the parts are in the position shown in black lines. Fig. 4 represents in black lines a front view of the machine when arranged for mowing, and in blue and red lines two of the different positions which the finger-beam and cutting apparatus are made to assume when being prepared or folded for transportation. Fig. 5 represents a section on lines *y y*, Figs. 1 and 4, when the machine is arranged for mowing, as shown in black lines, Fig. 4. Fig. 6 represents a plan or top view of finger bar or beam F′, shoe F, leading-wheel *g″*, and part of the coupling-arm or finger-bar extension-piece E′; and Fig. 7 represents a side view of one of the fingers and an end or cross section of the finger bar or beam, showing how a part of the finger is made to rise up by the front edge of the bar to keep the cutter-bar from working forward.

The side of the machine which runs next to the standing grain I call the "inside" and that which runs next to the cut grass or grain the "outside."

In the accompanying drawings, the main frame, which is of rectangular form, is represented by letters A A A′ A′. To the under side of parts A′ A′ are fastened the bearings of the main shaft or journal of the driving and supporting wheels B B′. To the inner hub of the latter is fastened a ratchet wheel or device, *a′*, while a similar ratchet device, *a*, is fastened to the outer hub or side of wheel B. Wheels B B′, with their hub-ratchets, are fitted loosely on shaft X. A sliding ratchet wheel or device, *b′*, works on shaft X, and is so connected therewith as to be revolved when said shaft revolves, but is susceptible of a lateral movement, so that it can be moved in and out of action with ratchet *a′* by means of pin *c′* in lever C, whose front end is pivoted to the under side of piece B″, fastened to the front of the frame. Pin *c′* fits into a groove turned in the part *b′*, so that the part *b′* operates like a sliding revolving clutch. A similar ratchet or clutch, *b*, is fitted to be worked by lever C′ on the outside of wheel B.

C″ is the driver's seat, which is fastened to the rear of the main frame, and in such a position as that levers C and C′ are both within his reach.

As the machine is drawn forward by tongue C‴ (shown in section) wheels B B′ revolve, and when both or either of the clutches *b b′* are in action, with their respective ratchets *a a′*, shaft X is caused to revolve, together with cog-wheel D, fastened thereto, and which gears into cog-wheel D′ on the shaft X′, supported at one end by hanger D″, depending from piece A″, and at the other in a projection, *d*, from hanger D‴, in which the short crank-shaft turns, the latter having on its rear end a bevel-gear, *d″*, which is opened by bevel-gear *d′* on the end of shaft X′.

On the front end of the crank-shaft is fitted a balance-wheel, *e*, with a crank-pin, upon which is placed the outer end of the pitman *e′*, which gives motion to the cutter-bar *e″*, to which are attached teeth *f*, which work as they vibrate through slotted open fingers *f′*.

The improvements which form the subject of this patent relate to that class of mowing-machines in which a "loose" finger-beam is used—that is, a finger-beam so connected to the main frame that the entire finger-beam, or either end thereof, can rise or fall to conform to the inequalities of the ground independent of the up and down motions of the main frame, and consist, first, in combining the finger-beam with a single-draft coupling-arm, one end of which is hinged to a bracket or hanger connected to the outer front corner of the main frame, while the other end extends out by or under the inner front corner of the main frame, and is there hinged to the heel of the finger-beam or to the shoe which supports the same; second, in hinging the coupling-arm to a bracket or hanger fastened to the front outer side or corner of the main frame, in combination with giving to said coupling-arm a bracing-support near the point or end where it is hinged to the heel of the finger-beam or shoe which supports the same.

It is not now deemed necessary to enter into a detailed description of the mowing and reaping machine represented in the drawings further than is necessary to illustrate the invention which forms the subject of this patent, as the machine is described in detail in other patented divisions of even date herewith, and to which reference can be had.

The finger-beam F′, to which are fastened the fingers which support and hold the grass while it is being severed by the cutters *f*, fastened to cutter-bar *e*″, is fastened at its heel end to a shoe, F, which shoe has two lugs, *g g*, upon its upper side, and between which one end of a coupling-arm, E′, is hinged, the other end of a coupling-arm being hinged, pivoted, or jointed to a bracket, E, as seen at *f*′. The coupling-arm has two holes, so that when the machine is to be used as a mower the heel of the finger-beam can be brought up close to the side of the machine, as seen in Fig. 4, while it can be set off, as seen in Figs. 1 and 2, when the machine is used for a reaper, so as to leave an open space, X″, between the platform and inside of the main frame, through which to deposit the gavels upon the ground. As the machine progresses on its wheels the coupling-arm is carried forward, and that in its turn carries forward the finger-beam and cutter, and as the coupling-arm is rigid laterally only, and its left end, to which the finger-beam is connected, free to rise and fall, the finger-beam necessarily rests on the ground. Therefore in passing over undulating ground the finger-beam will rise or fall at either or both ends, and sway up and down, as may be required, to conform to the surface of the ground.

The coupling-arm is strong, and possesses sufficient strength to carry forward the finger-beam; but as there would be great danger of its joint with the main frame giving way under a sudden strain, if left unsustained, a loop, E″, is fastened to the inner front corner or side of the frame, and through which the coupling-arm is allowed to pass, and in which it is free to rise and fall. The loop gives a strong support or brace to the coupling-arm near where the finger-beam is hinged thereto. It will thus be seen that by said improvements a front cut is obtained—that is, the finger-beam which supports the cutter is sustained or extends out from the front inner side of the machine—whereby all the advantages due to such a position of the cutting apparatus are obtained, and that, too, by the use of a single hinged draft coupling-arm arranged at right angles, or nearly so, to the line of motion of the machine.

Having described one mode of applying said improvements to practical use, the skill of the constructer will be sufficient to apply them to the various mowing-machines in use, wherever applicable, and it is evident that it can be so applied to many machines in use.

What is claimed therefore as the invention of said WILLARD and ROSS is—

1. The combination, with the finger-beam which supports the cutter or cutters, of a single-draft coupling-arm, one end of which is hinged or jointed to a bracket or hanger connected to the front outer corner of the main frame, while the other end extends out by or under the inner front corner of the main frame, and is there hinged or jointed to the heel of the finger-beam, or to the shoe which supports the same, substantially as and for the purpose herein described.

2. Hinging the coupling which carries forward the finger-beam, as aforesaid, to a bracket or hanger connected or fastened to the front outer corner of the main frame, in combination with giving to said coupling-arm a bracing-support at a point near the inner side of the main frame, substantially as and for the purpose herein described.

In testimony whereof I have hereunto subscribed my name.

JAMES A. SAXTON.

In presence of—
GEO. E. BALDWIN,
S. SURBURG.